May 14, 1968 — F. R. STAMP — 3,383,132
VEHICLE WINDSHIELD SUN VISOR
Filed Nov. 24, 1965 — 2 Sheets-Sheet 1
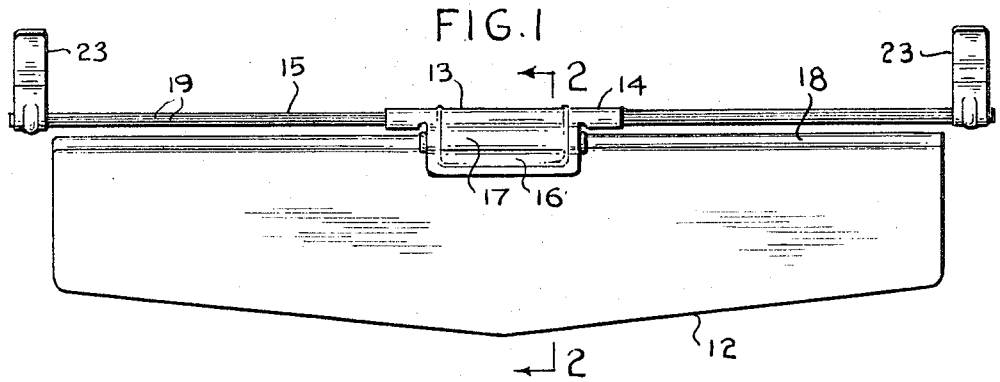
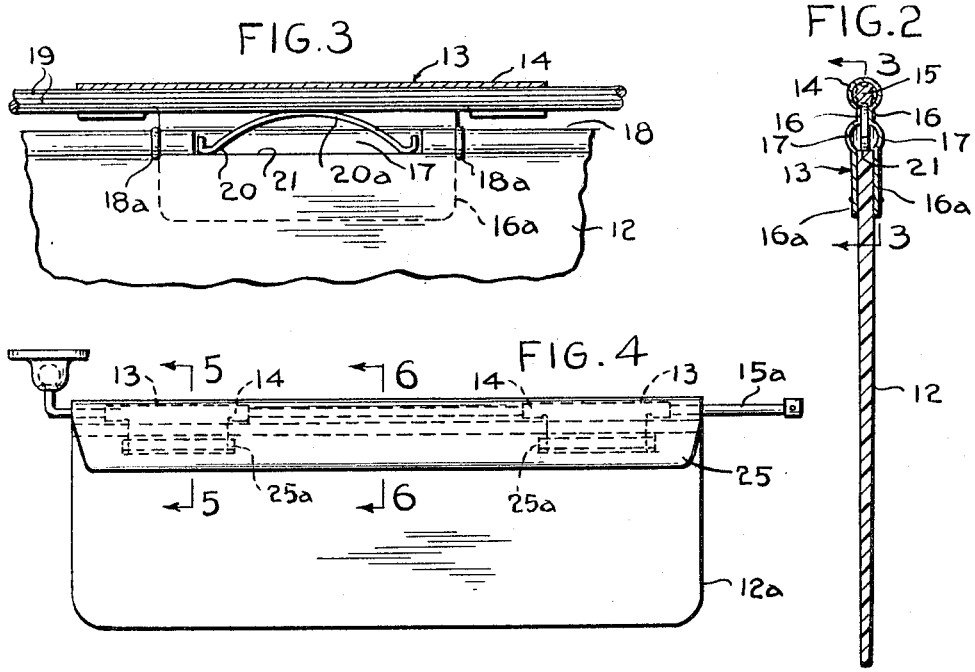
INVENTOR.
Floyd R. Stamp
BY William Cleland
Attorney

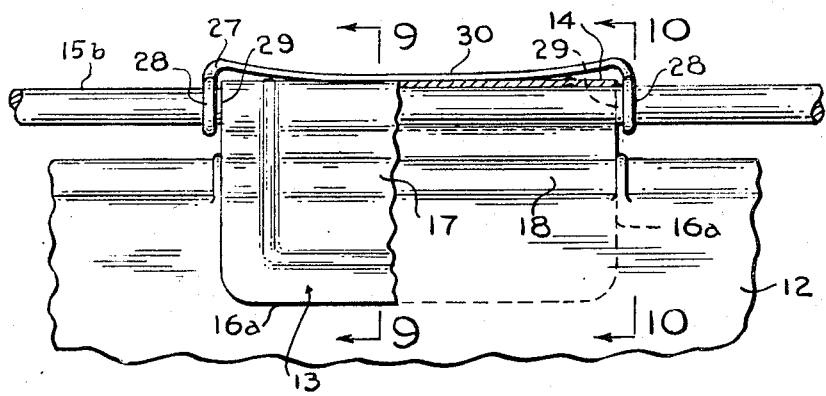
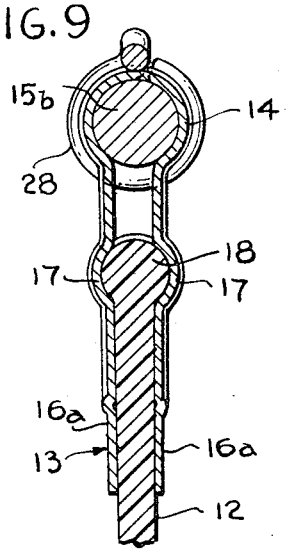
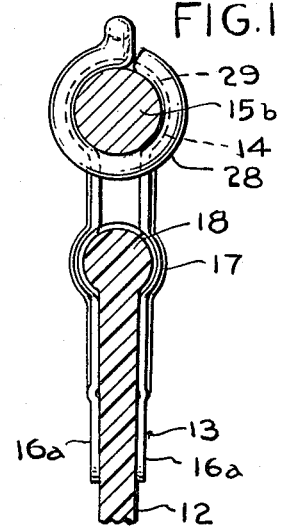
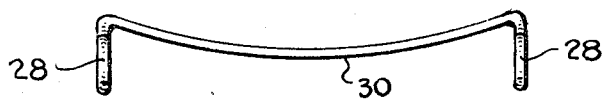

United States Patent Office 3,383,132
Patented May 14, 1968

3,383,132
VEHICLE WINDSHIELD SUN VISOR
Floyd R. Stamp, 4120 State Road,
Akron, Ohio 44319
Filed Nov. 24, 1965, Ser. No. 509,551
7 Claims. (Cl. 296—97)

ABSTRACT OF THE DISCLOSURE

Sun visor panel for vehicle windshield carried by spring clip angularly and slidably adjustable on relatively fixed rod. Spring means applies strong gripping pressure to clip against rod, resisting manual turning of clip to selected angular positions on same, while permitting longitudinal movement of clip on rod against gripping pressure.

---

This invention relates to a sun visor for adjustable attachment above the windshield of an automotive vehicle.

In the past it has been standard practice that automobiles be furnished with sun-deflecting windshield visors, generally including opaque panels pivotally attached to elongated supporting rods, which were in turn adjustably attached to the roof structures of the vehicles. Such visors have had somewhat limited use, however, because they blocked the view ahead when turned down too far and, accordingly, were not suitable for blocking glaring light within the driver's normal line of vision. Well-known types of sun visors, for example, were not suitable or satisfactory for reducing the glare of early morning sunlight or bright light coming horizontally from various sources toward the windshield. Windshields tinted near the top in known manner served a purpose of moderating the sun's glare, but at other times such tinting was disturbing because it distorted the view with respect to detail and coloring.

One object of the present invention is to provide an improved anti-glare sun visor unit which is easily attachable as an adjunct to the panels of sun visors generally furnished as original equipment on an automobile.

Another object of the invention is to provide a sun visor of the character described in which improved indexing means is provided for manifesting various angular positions of adjustment of the deflector panel with reference to a supporting rod therefor.

A still further object of the invention is to provide an improved sun visor including a safety cushion strip along the top edge of the deflector panel, and which also serves as auxiliary means for yieldingly retaining the visor in variously adjusted positions on its supporting rod.

Other objects of the invention will be manifest from the following brief description and the accompanying drawings.

Of the accompanying drawings:

FIGURE 1 is a front elevation of a sun visor of the invention, designed for attachment to an existing opaque type of sun visor panel generally furnished as standard equipment on automotive vehicles.

FIGURE 2 is an enlarged vertical cross-section, taken on the line 2—2 of FIGURE 1.

FIGURE 3 is a further enlarged fragmentary front elevation of a central portion of FIGURE 1, partly broken away and in section, substantially as viewed on the line 3—3 of FIGURE 2.

FIGURE 4 is a front elevation, corresponding to FIGURE 1, of a modified form of sun visor designed for use as original or replacement equipment on automotive vehicles.

FIGURES 5 and 6 are enlarged fragmentary cross-sections, taken on the lines 5—5 and 6—6, respectively, of FIGURE 4.

FIGURE 7 is a fragmentary perspective view of an elastic safety strip incorporated along the upper edge of the sun visor shown in FIGURES 4 to 6, on the same scale as FIGURES 5 and 6.

FIGURE 8 is a view corresponding to FIGURE 3, on a larger scale, illustrating another modified form of the invention, and likewise broken away and in section.

FIGURES 9 and 10 are enlarged cross-sections taken on the lines 9—9 and 10—10, respectively, of FIGURE 8.

FIGURE 11 is a side elevation of the holding spring used in the visor shown in FIGURES 8 to 10.

Referring particularly to FIGURES 1 to 5, there is shown a sun visor embodying the features of the invention, including an elongated rectangular panel 12 of green or otherwise tinted, clear transparent plastic material, such as molded ionomer resin sold by Dupont under the trademark "Durlyn." At least one generally U-shaped spring clip 13 may be formed of strong spring steel or the like to have an elongated tubular portion 14 rotatably and slidably received on an elongated, generally cylindrical supporting rod 15. Opposite side plates 16, 16 coextending from said tubular portion have oppositely disposed arcuate portions 17, 17 spaced below the tubular portion 14, for yieldingly receiving a beaded upper edge 18 of panel 12 and downward extensions 16a of the plates 16 yieldingly embrace opposite sides of said panel.

For yieldingly releasably retaining said clip 13 and panel 12 in various angular positions of rotation on rod 15, the latter may have therein peripherally spaced, longitudinally extending grooves 19, 19 for selective yielding reception of an arched central portion 20a of an elongated wire spring 20 opposite ends of said spring being received in an elongated recess 21 in the beaded upper edge of the panel to retain the spring against longitudinal movement with respect to the panel. Integral beaded enlargements 18a, 18a at opposite ends of recess 21 prevent longitudinal movement of the spring clip 13 with reference to the panel 12.

U-shaped spring clips 23, 23 may be yieldingly applied to be firmly affixed on opposite ends of the rod 15, so that opposite extensions of the clips 23 are adapted to be yieldingly gripped on spaced marginal edge portions of an existing opaque sun visor panel of known type (not shown) over a vehicle windshield.

As best shown in FIGURE 2, the panel 12 may be tapered downwardly so that the aforesaid glare-reducing tinting effect is intensified at the top of the panel, where filtering of sunlight is generally most needed, and by which maximum visibility is effected through the thinner lower portion of the panel.

Upon affixing the spaced clips 23 to an existing opaque panel, as described, the visor panel 12 is angularly adjustable about the rod 15 against the yielding engagement of the bowed or curvate portion 20a of spring 20 within the various grooves 19, until the proper angle of panel 12 is selected. In any position of angular adjustment of the panel, as described, the panel also may be longitudinally adjusted along the rod 15 as required. To this end, spaced annular beads 18a, 18a on the beaded upper edge portion 18 of the panel prevent relative movement of the spring clip 13 with respect to the panel.

Referring to FIGURES 4 to 6, there is illustrated a modification of the invention which is similar to the structure described above except that two spring clips 13, 13 are provided, and a U-shaped safety strip 25 of molded foam elastic material, as shown in FIGURE 7, is yieldingly expanded over the supporting rod 15a, the clips 13, exposed portions of rod 15a, and corresponding portions of the transparent panel 12a. The material of strip 25 may be foamed ethyl vinyl or polyurethane of between 40 to 75 durometer hardness, or is otherwise sufficiently elastic to serve as a cushion against possible injury, as by striking the head against the upper portion of the panel. Strip 25 also serves to grip exposed portions of rod 15a for holding the panel 12a in adjusted angular positions thereof on the rod. Rod 15a may have a swivel connector 26 thereon for attaching the rod directly to a vehicle roof structure is known manner. For holding the opposite downturned portions of strip 25 inwardly against the plate extensions 16, slips 25a, 25a may be molded in said downturned portions to receive edges 25b, 25b of the plate extensions 16a.

FIGURES 8 to 10 illustrate another modification of the angularly out-turned invention, which is generally like that shown in FIGURES 1 to 3, except that the rod 15b may be smoothly cylindrical, and that a different holding spring 27 is provided (see FIGURE 11). Spring 27 is shown as having loops 28, 28 through which rod 15b is slidably received, and which embrace opposite ends 29, 29 to tubular part 14 of spring clip 13, to have an intermediate inwardly arched portion 20 in very strong yielding engagement with tubular part 14. This gripping action of the spring is sufficient to press the tubular part against rod 15b to hold the panel in any selected angular position with respect to the rod. Unless otherwise noted, like parts are given the same identifying numerals as in FIGURES 1 to 3.

Other modifications of the invention may be resorted to without departing from the spirit thereof or the scope of the appended claims.

What is claimed is:

1. A sun visor as for vehicle windshields, comprising: an elongated supporting rod; at least one spring clip of springy sheet material formed with an elongated tubular portion rotatably receiving said rod and having spaced outturned extensions; a sun-deflecting panel having a marginal edge yieldingly received between said extensions on said spring clip; said panel and extensions having complementally interlocking bead and recess portions on said panel and extensions, respectively, for retaining the panel on the spring clip; means yieldingly interengaging between said panel and said rod, yieldingly to retain the panel in various angularly adjusted positions of relative rotation of the same on the rod and means for locking said clip against movement thereof along said marginal edge; said yieldingly interengaging means including peripherally spaced ribs and grooves extending longitudinally of said rod and a spring-pressed detent carried by said clip to be engageable within a selected one of said grooves and to be longitudinally slidable therein with movement of the clip along the rod.

2. A sun visor as in claim 1, said panel having a recess in said marginal edge thereof, said spring-pressed detent being a bowed spring retained in said recess by portions of said clip to present a convex edge of the bowed spring yieldingly within a selected said groove in said rod, whereby said panel and clip are rotatable to various locked angles on said rod against the yielding action of said convex edge in passing over the ribs between said grooves.

3. A sun visor as in claim 2, including a strip of molded elastic material yieldingly expanded about said rod, said at least one clip, and said marginal edge of the panel, by the inherent tendency of the strip to resume molded shaped thereof, the yielding grip of said strip about said rod thereby yieldingly resisting movement of the panel from said angularly adjusted positions.

4. A sun visor as in claim 2, including a strip of molded elastic material yieldingly expanded about said rod, said at least one clip, and said marginal edge of the panel, by the inherent tendency of the strip to resume molded shape thereof, the yielding grip of said strip about said rod thereby yieldingly resisting movement of the panel from said angularly adjusted positions, said clip extensions having angularly disposed ends engaging in slot means provided in the elastic strip, thereby to anchor the strip to said at least one clip.

5. A sun visor as for vehicle windshields, comprising: an elongated supporting rod; at least one spring clip of springy sheet material formed with an elongated tubular portion rotatably and longitudinally slidably receiving said rod, and having spaced outturned extensions; a sun-deflecting panel having a marginal edge yieldingly received between said extensions on said spring clip; said panel and said clip having complementally interlocking portions relatively fixedly retaining the panel between said spring clip extensions; and locking means yieldingly interengaging between said panel and said rod, yieldingly to retain the panel in various angularly adjusted positions of relative rotation of the same on the rod; said locking means including an elongated arched spring terminating in apertured ends receiving said rod therethrough to have said spring clip intermediate said apertured ends, and the arched portion of the spring in yielding engagement with said tubular portion frictionally to grip the spring clip on the rod against rotational movement of the clip and panel on the rod; and means on said rod for mounting the same on the vehicle in association with the windshield thereof.

6. A sun visor as for vehicle windshields, comprising: an elongated supporting rod; at least one spring clip of springy sheet material formed with an elongated, generally tubular portion rotatably and longitudinally slidably receiving said rod, and having spaced outturned extensions; a sunlight-deflecting panel having a marginal edge yieldingly gripped between said extensions on said spring clip; said panel and said clip having complementally interlocking portions relatively fixedly retaining the panel between said spring clip extensions; locking means including an elongated arched spring mounted for longitudinal movement with said clip and yieldingly maintaining said tubular portion in frictional engagement with said rod, against manual force applied to said clip and panel to urge the same to selected positions of angular and longitudinal adjustment relative to said rod; and means on said rod for mounting the same on the vehicle in association with the windshield thereof.

7. A sun visor as in claim 6, said panel having a recessed portion opposite said rod defining longitudinally spaced shoulders, and said spring having opposite terminal ends cooperating with said said shoulders to obtain the spring against substantial longitudinal movement within the recessed portion; said rod having peripherally spaced ribs and grooves extending longitudinally thereof, said arched spring portion being yieldingly engageable within a selected one of said grooves to be longitudinally slidable therein with said movement of the clip along the rod.

References Cited
UNITED STATES PATENTS

| | | | |
|---|---|---|---|
| 1,880,582 | 10/1932 | Thorp | 296—97 |
| 2,103,863 | 12/1937 | Meller | 296—97 |
| 2,201,377 | 5/1940 | Schoenheit | 296—97 |
| 2,528,038 | 10/1950 | Crise | 296—97 |
| 2,622,922 | 12/1952 | Schroeder | 296—97 |
| 2,628,125 | 2/1953 | Jacobs | 296—97 |
| 2,703,254 | 3/1955 | Shockey | 296—97 |

FOREIGN PATENTS 574,526   1/1946   Great Britain.

RICHARD J. JOHNSON, Primary Examiner.

BENJAMIN HERSH, Examiner.

J. A. PEKAR, Assistant Examiner.